(12) United States Patent
Zhang et al.

(10) Patent No.: US 9,654,914 B2
(45) Date of Patent: May 16, 2017

(54) METHOD AND APPARATUS FOR MOBILE POSITIONING

(75) Inventors: Yang Zhang, Shanghai (CN); Edison Shu, Shanghai (CN); Aron Yu, Shanghai (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 112 days.

(21) Appl. No.: 14/396,626

(22) PCT Filed: Jun. 11, 2012

(86) PCT No.: PCT/EP2012/060986
§ 371 (c)(1),
(2), (4) Date: Oct. 23, 2014

(87) PCT Pub. No.: WO2013/159835
PCT Pub. Date: Oct. 31, 2013

(65) Prior Publication Data
US 2015/0065165 A1    Mar. 5, 2015

(30) Foreign Application Priority Data

Apr. 27, 2012    (WO) ................ PCT/CN2012/074803

(51) Int. Cl.
*H04W 4/02* (2009.01)
*G01S 19/48* (2010.01)
(Continued)

(52) U.S. Cl.
CPC ............. *H04W 4/02* (2013.01); *G01S 5/0236* (2013.01); *G01S 5/0252* (2013.01);
(Continued)

(58) Field of Classification Search
None
See application file for complete search history.

(56) References Cited

U.S. PATENT DOCUMENTS

2004/0202194 A1* 10/2004 Annamalai ............ H04W 8/08
370/446
2004/0203856 A1    10/2004 Wigren et al.
(Continued)

FOREIGN PATENT DOCUMENTS

CN    WO 2010123418 A1 * 10/2010 ........... G01S 5/0257

OTHER PUBLICATIONS

International Search Report for International Application No. PCT/EP2012/060986 mailed Apr. 11, 2013, 4 pages.
(Continued)

*Primary Examiner* — Olumide T Ajibade Akonai
*Assistant Examiner* — Margaret G Mastrodonato
(74) *Attorney, Agent, or Firm* — Sage Patent Group

(57) ABSTRACT

A method and system for determining a position of a UE includes a first network node receiving a request for positioning information about the UE. The first network node requests a first positioning procedure at a first location node. The first location node determines using the first positioning procedure that involvement by a second location node is needed. The first location node initiates a trigger for positioning information about the UE to be sent to the second location node. The second location node, upon receiving the trigger for positioning information and determining the presence of an environment measurement parameter, determines the position information of the UE by performing a second positioning procedure based on the environment measurement parameter, and sends a position calculation response with the positioning information.

24 Claims, 6 Drawing Sheets

(51) Int. Cl.
    *G01S 5/02*    (2010.01)
    *H04W 64/00*    (2009.01)
    *H04W 4/20*    (2009.01)

(52) U.S. Cl.
    CPC ............ *G01S 5/0257* (2013.01); *G01S 19/48* (2013.01); *H04W 4/20* (2013.01); *H04W 64/00* (2013.01)

(56) References Cited

U.S. PATENT DOCUMENTS

| | | | |
|---|---|---|---|
| 2004/0259566 A1* | 12/2004 | Maanoja | G01S 5/0018 455/456.1 |
| 2009/0177730 A1* | 7/2009 | Annamalai | H04W 4/02 709/202 |
| 2011/0231561 A1 | 9/2011 | Pawson et al. | |
| 2011/0256875 A1* | 10/2011 | Edge | H04W 4/02 455/440 |

OTHER PUBLICATIONS

Written Opinion of the International Searching Authority for International Application No. PCT/EP2012/060986 mailed Apr. 11, 2013, 8 pages.

Wigren: "Adaptive enhanced cell ID fingerprinting localization by clustering of precise position measurements" Vehicular Technology, IEEE Transactions on (vol. 56, Issue 5); Sep. 24, 2007; pp. 3199-3209.

Shi et al.: "AECID Fingerprinting Positioning Performance", Global Telecommunications Conference, 2009. Globecom 2009. IEEE, Piscataway, NJ, USA, Nov. 30, 2009, 6 pages.

3GPP TS 25.215 V12.0.0 (Sep. 2014) $3^{rd}$ Generation Partnership Project; Technical Specification Group Radio Access Network; Physical layer; Measurements (FDD) (Release 12); 650 Route des Lucioles—Sophia Antipolis, Valbonne, France; 24 pages.

3GPP TS 25.305 V10.0.0 (Sep. 2010) $3^{rd}$ Generation Partnership Project; Technical Specification Group Radio Access Network; Stage 2 functional specification of User Equipment (UE) positioning in UTRAN (Release 10); 650 Route des Lucioles—Sophia Antipolis, Valbonne, France; 80 pages.

3GPP TS 25.453 V10.3.0 (Nov. 2011) $3^{rd}$ Generation Partnership Project; Technical Specification Group Radio Access Network; UTRAN Iupc interface Positioning Calculation Application Part (PCAP) signalling (Release 10); 650 Route des Lucioles—Sophia Antipolis, Valbonne, France; 321 pages.

3GPP TS 43.059 V10.0.0 (Mar. 2011) $3^{rd}$ Generation Partnership Project; Technical Specification Group GSM/EDGE Radio Access Network; Functional stage 2 description of Location Services (LCS) in GERAN (Release 10); 650 Route des Lucioles—Sophia Antipolis, Valbonne, France; 69 pages.

* cited by examiner

METHOD AND APPARATUS FOR MOBILE POSITIONING

CROSS REFERENCE TO RELATED APPLICATION

This application is a 35 U.S.C. §371 national stage application of PCT International Application No. PCT/EP2012/060986, filed on 11 Jun. 2012, which itself claims the benefit of PCT International Application No. PCT/CN2012/074803 filed on 27 Apr. 2012, the disclosures and contents of both of which are incorporated by reference herein in their entirety. The above-referenced PCT International Application was published in the English language as International Publication No. WO 2013/159835 A1 on 31 Oct. 2013.

TECHNICAL FIELD

The present invention relates to positioning in wireless communications networks and more particularly to a method and apparatus for determining a position of a User Equipment.

BACKGROUND

Also known as Radio Pattern Matching or Radio Signature positioning, Fingerprinting technologies represent a family of Path Loss based technologies that rely on matching the Radio Frequency (RF) environment, as experienced by the User Equipment (UE), to the known or estimated or otherwise mapped characteristics of the larger RF System in which the UE is operating. Information from the UE, including measurements of neighbor cell signal strengths, time delay and other network parameters form the basis of the RF environment to be compared to the established system RF Database. The intent of this approach is to mitigate the negative impacts of anomalies within the RF environment that challenge the accuracy of trilateration technologies (e.g. multipath and reflection).

The RF fingerprinting positioning method is based on measurements made by the UE and Base Station. The essential measurement set required for this method is currently defined in [3GPP TS 25.215—expand reference] and necessary for the basic mobility functionality and hence this method will work with existing mobiles without any modification.

Fingerprinting positioning algorithms operate by creating a radio fingerprint for each point of a fine coordinate grid that covers the Radio Access Network (RAN). Each such measurement may be associated with an identity (ID) of a Radio Base Station (RBS). A database with fingerprints is associated with true positions on the ground—radio related measurements of mobile device/user equipment may then be matched with this database to obtain their position. The fingerprint may e.g. consist of:

The cell Ids that are detected by the terminal, in each grid point.
Quantized path loss or signal strength measurements, with respect to multiple RBSs, performed by the terminal, in each grid point.
Quantized Round Trip Time (RTT), in Wideband Code Division Multiple Access (WCDMA), or Timing Advance (TA), in Global System for Mobile communications (GSM) and Long Term Evolution (LTE), or UE Rx-Tx time difference (in LTE) in each grid point.
Quantized noise rise, representing the load of a CDMA system, in each grid point.
Quantized signal quality e.g. RxQual in GSM, Ec/N0 in WCDMA and RSRQ in LTE.
Radio connection information like the radio access bearer (RAB).
Quantized time.

The source of the fingerprint can be:
A driving test is performed that operator uses tool such as TEMS (http://www.ascom.com/en/index/group/divisions/network-testing-home.htm?_metal-site=US&_metal-lang=en) to collect data along the road, and use the collected data to populate the fingerprint database. This is usually known as offline collection.
During normal positioning session which high accuracy positioning methods, e.g. Assisted GPS (A-GPS), Observed Time Difference Of Arrival (positioning method) (OTDOA) etc., are available, the positioning result from the high accuracy methods together with the radio data can be used to populate the fingerprint database. This is usually known as online collection.
Based on the popular propagation model such as Cost 231-Hata, SPM (Standard Propagation Model) etc. which is frequently used in cell planning and related researches, the signal strength/quality can be simulated in the target area. Those "Virtual" data can be used to populate the fingerprint database.

Whenever a position request arrives, a radio fingerprint is first measured, after which the corresponding grid points with similar characteristic are looked up and a location estimate is calculated and reported.

AECID (Adaptive Enhanced Cell ID) developed by the applicant is one kind of fingerprinting positioning technology that refines the basic cell identity positioning method in a variety of ways.

AECID has been described in US-2004/0203856 as well as in the following publications:
T. Wigren, "Adaptive enhanced cell ID fingerprinting localization by clustering of precise position measurements", IEEE Trans. Veh. Tech., vol. 56, pp. 3199-3209, 2007
L. Shi and T. Wigren, "AECID fingerprinting positioning performance", in Proc. Globecomm 2009, Honolulu, U.S.A, pp. 2767-2772, Nov. 30-Dec. 4, 2009.

The AECID positioning method is based on the idea that high precision positioning measurements, e.g. A-GPS measurements, can be seen as points that belong to regions where certain cellular radio propagation condition persist.

In a first step A-GPS positioning is performed at the same time of UE network signal measurement. The AECID positioning method introduces a tagging of high precision measurements according to certain criteria, e.g. including The cell Ids that are detected by the terminal, in each grid point.
Quantized path loss or signal strength measurements, w.r.t. multiple RBSs, performed by the terminal, in each grid point.
Quantized Round Trip Time (RTT, in WCDMA) or Timing Advance (TA, in GSM and LTE), or UE Rx-Tx time difference(in LTE) in each grid point.
Quantized noise rise, representing the load of a CDMA system, in each grid point.
Quantized signal quality e.g. RxQual in GSM, Ec/N0 in WCDMA and RSRQ in LTE.
Radio connection information like the radio access bearer (RAB).

Quantized time.

The tag consist of a vector of indices, each index taking an enumerable number of discrete values. Continuous variables used for tagging, like path loss, hence need to be quantized.

In a second step collect all high precision positioning measurements that have the same tag in separate high precision measurement clusters, and perform further processing of said cluster in order to refine it. Geographical region can be smaller than the extension of a cell of the cellular system.

In a third step a polygon that represents the geographical extension of a cluster is computed, for each stored high precision position measurement cluster. The two most pronounced properties of the algorithm include:

The area of the polygon is minimized (accuracy hence maximized).

The probability that the terminal is within the polygon (the confidence) is precisely known (it is set as a constraint in the algorithm).

In a fourth step, for an incoming positioning request, the UE's network measurement is firstly obtained. By looking up cell Ids or tags, the polygon corresponding to the determined tag is then looked up in the tagged database of polygons, followed by reporting, e.g. over RANAP using the polygon format.

A Serving Mobile Location Center (SMLC)—SMLC interface is defined for GSM EDGE (Enhanced Data Rates for GSM Evolution) Radio Access Network (GERAN) by The 3rd Generation Partnership Project 3GPP in TS 43.059 V10.0.0 (2011 March). The 3rd Generation Partnership Project 3GPP has in TS 25.453 V10.3.0 (2011 June) standardized Universal Terrestrial Radio Access Network (UTRAN) Iupc interface Positioning Calculation Application Part (PCAP) signaling. In the UTRAN context, an SMLC can be located inside a Radio Network Controller (RNC) or as Standalone SMLC (SAS). Despite that an SMLC-SMLC interface is defined for GERAN in TS 43.059, the UTRAN specification TS 25.453 does not specify such interface in architecture or for positioning signaling flow There are needs for location services that require both location accuracy and user transparency (Government Surveillance and Lawful Intercept). These services cannot be addressed with location technologies which require UE support or modification, for example Assisted GPS (A-GPS) or Observed Time Difference Of Arrival (OTDOA). Additionally, Emergency Service applications require a level of location accuracy which cannot be met with Cell-ID and RTT. The potential benefits of RF fingerprinting and the relative ease with which this location method can be adopted in the UTRAN would indicate that it is appropriate that the technology be included in the UTRAN in support of the services noted above, as well as for cooperative deployment with satellite-based systems, A-GPS, Assisted Global Navigation Satellite System (GNSS) (A-GNSS) etc., in support of "Hybrid" location technology for Location Based Services (LBS).

Because of the lacking standardization for UTRAN, there is a need, in particular in multi-vendor situations, for a solution allowing access to a mobile location center, for example having capability for specific positioning methods such as fingerprinting or AECID, with minor impact on existing standards.

SUMMARY

It is an object of the invention to provide a method and apparatus for determining a position of a user equipment mitigating the problem of lacking access to a mobile location center with minor impact on existing standards.

One aspect of the invention relates to a method for determining a position of a UE. The method comprises the steps of a first network node receiving a request for positioning information about the UE; the first network node requesting a first positioning procedure at a first location node; the first location node determining using the first positioning procedure that involvement by a second location node is needed; the first location node initiating a trigger for positioning information about the UE to be sent to the second location node; the second location node, upon receiving the trigger for positioning information and determining the presence of an environment measurement parameter, determining the position information of the UE by performing a second positioning procedure based on the environment measurement parameter, and sending a position calculation response with the positioning information.

It is an advantage of the invention that the second location node, upon receiving the trigger for positioning information and determining the presence of an environment measurement parameter, determining the position information of the UE by performing a second positioning procedure based on the environment measurement parameter, provides for flexible deployment and allowing access to a mobile location center with minor impact on existing standards.

Some location nodes may then be arranged to support a certain positioning method only (for example AECID), the result of that positioning method is delivered to for example a peer location node or RNC which decides which positioning result(s) to use.

With a more flexible topology a dedicated location node (e.g. a SMLC only handles AECID positioning) can be used by RNCs or location nodes from different vendor's utilizing the strength of different vendors for different positioning methods such as A-GPS or fingerprinting.

In another aspect the invention relates to a method for determining a position of a UE, performed by a location node, comprising the steps of receiving a request for a first positioning procedure; determining using the first positioning procedure that involvement by a second location node is needed; initiating a trigger for positioning information about the UE to be sent to the second location node.

Yet another aspect of the invention relates to a location node for determining a position of a UE comprising an interface unit adapting location node for receiving a request for a first positioning procedure; a determination unit adapting the location node for:

determining using the first positioning procedure that involvement by a second location node is needed, and; the interface unit further adapting the location node for initiating a trigger for positioning information about the UE to be sent to the second location node.

A further aspect of the invention relates to a method for determining a position of a UE performed by a location node, comprising the steps of receiving a trigger for positioning information; determining the presence of an environment measurement parameter in said trigger; determining the position information of the UE by performing a positioning procedure based on the environment measurement parameter, and sending a position calculation response with the positioning information.

Yet a further aspect of the invention relates to a location node for determining a position of a UE comprising an interface unit adapting location node for receiving a trigger for positioning information; a determination unit adapting the location node for determining the presence of an environment measurement parameter in said trigger and determining the position information of the UE by performing a positioning procedure based on the environment measurement parameter, and; the interface unit further adapting the location node for sending a position calculation response with the positioning information.

Embodiments of the invention will now be described in more detail with reference to the enclosed drawings.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Example embodiments of the invention generally relates to fingerprinting positioning technologies which is now widely used and also discussed during 3GPP standardization. The idea is on how to calculate positioning estimate and collect radio characteristics measurement online in a uniform way.

By using mechanisms such as PCAP Position Calculation procedure for both fingerprinting (e.g. AECID) positioning, and on-line data collection of RF measurement data paired with accurate positioning data (such as A-GPS) a signaling solution for multi-vendor deployment is provided. Thereby, if both a measurement report and a high accuracy location (e.g. GPS result) is included in a Position Calculation Request (send from RNC to SMLC or from a first SMLC to a second SMLC), the receiving SMLC then has the option to save both data for fingerprint database population. On the other hand, if only a measurement report is included in the Position Calculation Request, the receiving SMLC can assume that a positioning result is expected and thereby perform positioning, such as fingerprinting or AECID positioning and return the positioning result in a Position Calculation Response.

Such a solution is flexible for deployment and has minor impact on existing standards thereby enabling multi-vendor solutions.

Figure 1:
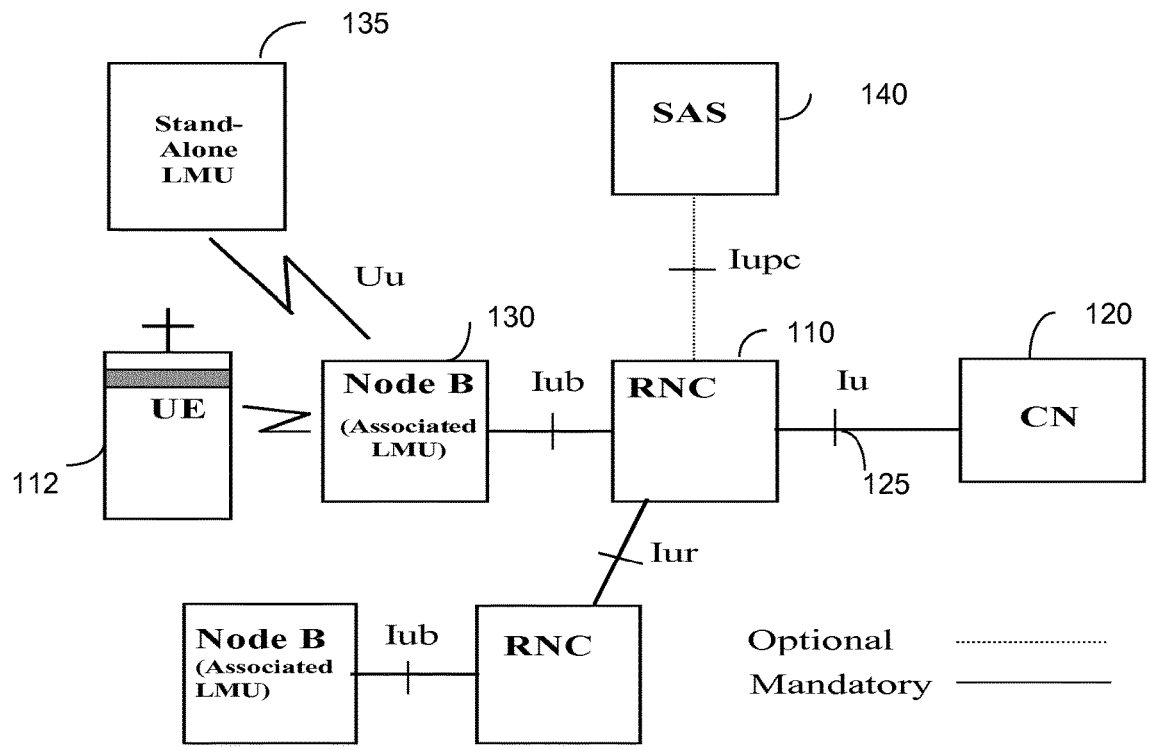
FIG. 1 shows a block diagram for a LoCation Service (LCS) architecture in UTRAN.

FIG. 1 is a block diagram showing an LCS architecture in UTRAN.

In accordance with 3GPP TS 25.305 V10.0.0 (2010 September) communication among the UTRAN UE Positioning entities makes use of the messaging and signalling capabilities of the UTRAN interfaces (Iub, Iur, Iupc).

The serving RNC 110, receives authenticated requests for UE 112 positioning information from the Core Network (CN) 120 across the Iu interface 125. RNCs manage the UTRAN resources (including Node Bs 130, Location Measurement Units (LMU) 135, the SAS 140) the UE and calculation functions, to estimate the position of the UE and return the result to the CN. The serving RNC may also make use of the UE Positioning function for internal purpose e.g. position based handover.

Figure 2:
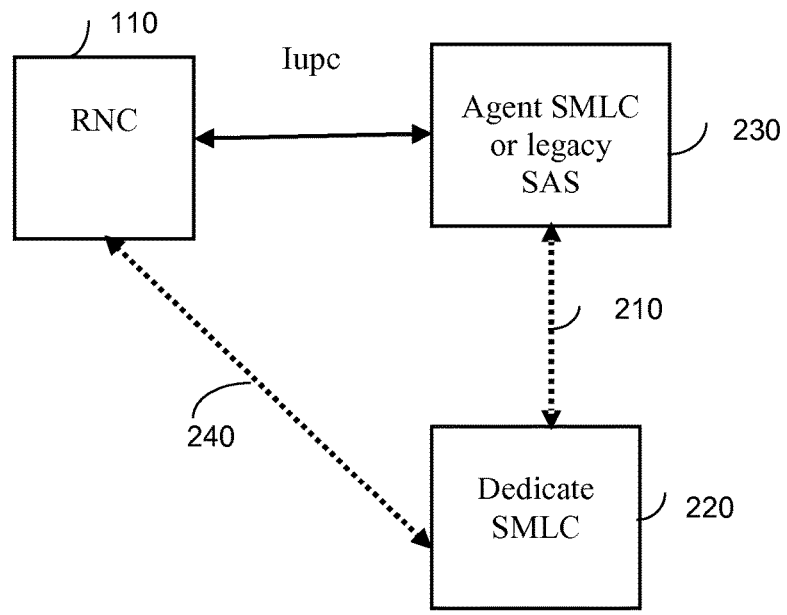
FIG. 2 is a block diagram that shows a topology for LCS in WCDMA according to an embodiment of the invention.

FIG. 2 is a block diagram that shows a topology for LCS in WCDMA according to an embodiment of the invention.

Due to the importance of LCS for example for positioning of emergency connections (e.g. E-911) there is a need to extend the architecture of FIG. 1 by:

1) Add new interface 210 between SMLCs for better flexibility. Some SMLCs may then be configured to support a certain positioning method only (for example AECID), the result of that positioning method is delivered to a peer SMLC which decides which positioning result(s) to use. The two SMLCs are hereinafter referred to as Dedicated SMLC (D-SMLC) 220 and Agent SMLC (A-SMLC) 230 respectively, as shown in FIG. 2.

2) The D-SMLC may also be able to serve an RNC 110 for providing location estimate use an only (single) method using the interface 240.

The RNC should be able to send messages e.g. PCAP POSITION CALCULATION REQUEST according to TS 25.453 V10.3.0 (2011 June) and might therefore also be considered as and RNC with internal SMLC.

Benefits with introducing a D-SMLC are:

1) Align the deployment structure to better co-exist with Uplink-Time Difference of Arrival (UTDOA) where there is dedicated Position Determination Entity (PDE).

2) More flexible topology so a dedicated SMLC (e.g. a SMLC only handles AECID positioning) can be used by all RNC or SMLC from different vendors, since vendors' competence and associated SMLC capability in LCS and positioning accuracy may differ. For example some vendors SMLC's are good at A-GPS however do not have good solution for e.g. fingerprinting.

Figure 3:
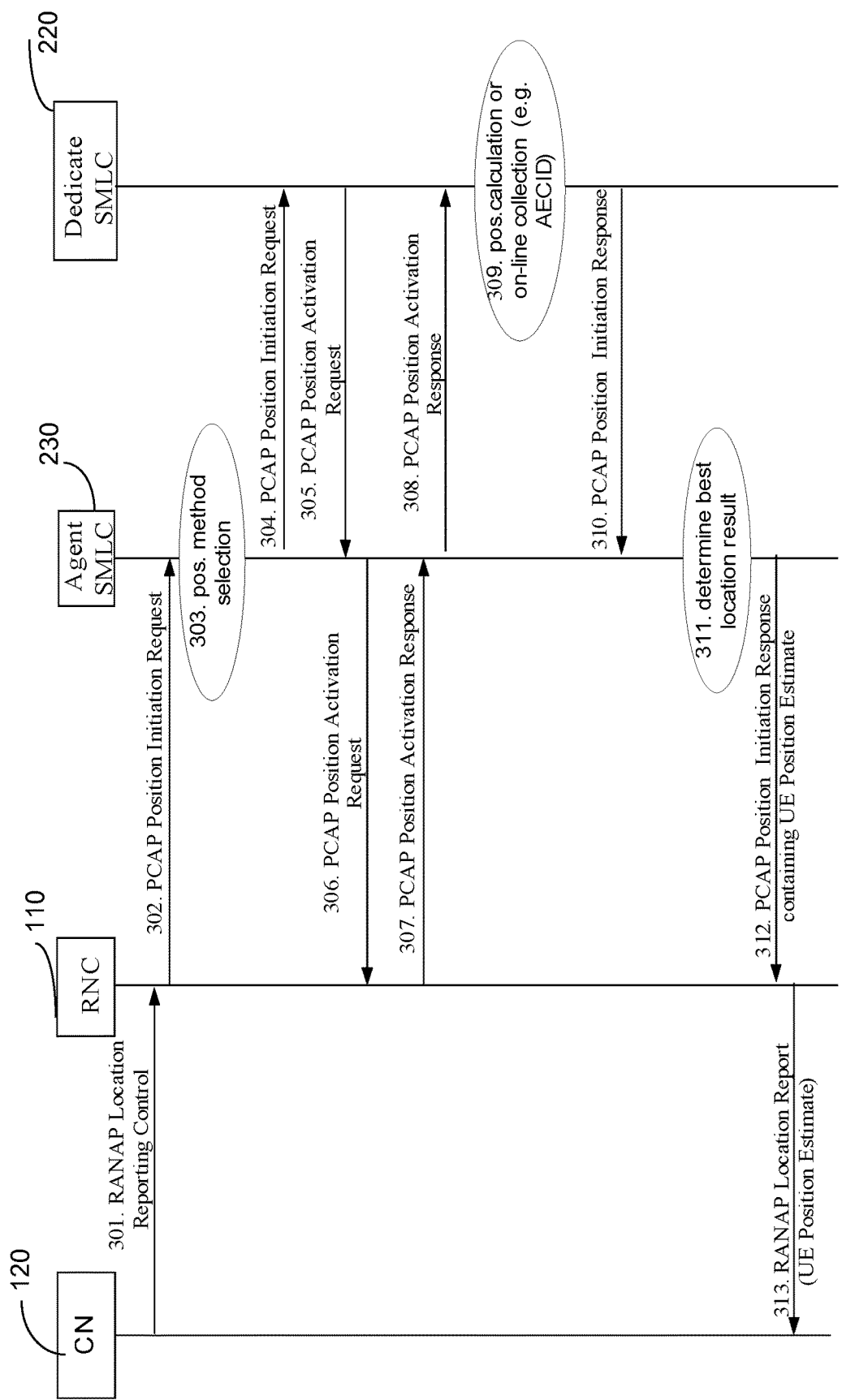
FIG. 3 is a message sequence diagram showing mobile positioning according to a first exemplary embodiment.

This solution provides the new interface 210, 240 (dashed arrow in FIG. 2) by taking below factors into consideration:
1) Signaling efficiency.
2) Implementation cost
3) Future-proof
4) Small impact on standard FIG. 3 is a message sequence diagram showing mobile positioning according to a first exemplary embodiment.

Below steps is a typical signaling sequence. CN (Core Network) 120 may be a Mobile Switching Center (MSC).

The operation begins in step 301 with an authenticated request for positioning information about a UE from an application in the core network being received at a first network node such as an RNC 110. The request from the CN may be a request for on-demand or periodic reporting. The RNC acts as interface between the Core Network and the UE Positioning entities in the UTRAN.

In step 302 the RNC requests a first positioning procedure at a first location node, A-SMLC 230, by sending parameters received in the location request, including any periodic reporting information, together with the Cell ID and UE capability information to the A-SMLC, in a PCAP: Position Initiation Request message via the Iupc interface.

Depending on the UE capabilities, QoS requirement and local configuration (not limited to), the A-SMLC selects positioning method(s) to be performed in step 303.

If a positioning procedure not supported by the A-SMLC, for example AECID or another fingerprinting method, is selected, the A-SMLC determines in step 304 that involvement by a second location node, D-SMLC 220, is needed and initiates a trigger for positioning information about the UE to be sent as a PCAP: Position Initiation Request to D-SMLC with/without change to the original message content. For example, "Response Time", "UE Positioning Capability" may be updated in order to make D-SMLC react accordingly. An alternative is that A-SMLC forward PCAP: POSITION CALCULATION REQUEST to the D-SMLC. This signal initiates signals in steps 305-307 below such that in step 308 a trigger for positioning information about the UE is sent to the D-SMLC.

In step 305 the D-SMLC initiates an AECID positioning procedure or another fingerprinting method by sending a PCAP: Position Activation Request message containing requested cell measurement types via the Iupc interface. The PCAP Position Activation Request message may include periodic reporting information (number of reports and reporting interval). D-SMLC may in this case be configured perform AECID only i.e. only AECID is enabled as the only positioning method available in D-SMLC The A-SMLC forwards to the RNC the Position Activation Request received from the D-SMLC using Iupc signaling in step 306. The RNC gets the requested measurements from UE via Radio Resource Control (RRC) signaling.

In step 307 the information obtained in step 306 is sent from the RNC to the A-SMLC in a PCAP: Position Activation Response message.

The A-SMLC forwards in step 308 the trigger for positioning information about the UE to the D-SMLC with the information in step 306 with/without change to the original message content. For example, the "UE position estimate info" which is intended to be used for location reporting may also be used for AECID on-line data collection (according to TS 25.453 V10.3.0 (2011 June) paragraph 9.1.17 position activation response the optional parameter UE Position Estimate Info is used for Position information for UE based positioning methods). That is, if A-SMLC can have high accuracy positioning result (e.g A-GPS/UTDOA) at hand, it may add "UE position estimate info" element in Position Activation Response and forward it to D-SMLC together with "Cell-ID Measured Results Sets". "Position Activation Response" may include "UE position estimate info" which is of type "Geographical Area" in accordance with 3GPP TS25.453 par 9.2.2.102.

The D-SMLC calculates the UE position and optional velocity in step 309 using a second positioning procedure such as fingerprinting, e.g. the AECID method. If both a geographical area information parameter such as "UE position estimate info" and an environment measurement parameter such as "Cell-ID Measured Results Sets" are available, D-SMLC has the option to do either on-line data collection and populate a database with these parameters or AECID positioning, based on logic according to FIG. 5 and FIG. 6. Thus, the D-SMLC, upon receiving the trigger for positioning information and determining the presence of an environment measurement parameter, determining the position information of the UE by performing a second positioning procedure based on the environment measurement parameter. Such as environment measurement parameter can comprise RF measurement data such as cell Ids, Quantized path loss, signal strength measurements, Quantized Round Trip Time (RTT, in WCDMA) or Timing Advance (TA, in GSM and LTE), or UE Rx-Tx time difference (in LTE), Quantized noise rise, Quantized signal quality e.g. RxQual in GSM, Ec/N0 in WCDMA and RSRQ in LTE, Radio connection information like the radio access bearer (RAB), Quantized time. Preferably, the database is only populated if the geographical area information parameter meets an accuracy criterion as for example a certain shape or precision metric. Sufficiently accurate position measurements can be obtained using high precision reference method such as A-GPS, OTDOA, U-TDOA. Thereby based on "initial UE position estimate", D-SMLC may apply different logic (FIG. 5/FIG. 6) to do either positioning or data collection (record down both accurate location of terminal and its measurement report).

The position calculation response with the positioning information is sent in step 310. If periodic reporting was not requested in step 302, the D-SMLC returns in step 310 the UE position and optional velocity to the A-SMLC in a PCAP: Position Initiation Response message. If periodic reporting was requested in step 302, the D-SMLC forwards the position information to the A-SMLC in a PCAP Position Periodic Result message. The PCAP Position Initiation Response or PCAP Position Periodic Result message may include the positioning method(s) used and an indication of whether the position estimate satisfies the requested accuracy or not.

In step 311 the A-SMLC decides which positioning result to use for return, because there can also be e.g. UTDOA/AGPS attempts in the same positioning session.

In step 312-313 the RNC passes the position estimate received from the A-SMLC to the CN including the positioning method (or the list of the methods) used to obtain the position estimate. If the CN has requested accuracy for the position estimate, the Location response shall include an indication whether the position estimate satisfies the requested accuracy or not.

In this flow, the signaling between A-SMLC and D-SMLC follows current PCAP in SAS centric mode, which is acceptable however having some drawbacks:

1) Redundant signaling. The AECID positioning flow (between A-SMLC and D-SMLC) in theory can be done in just one signaling round i.e. one request from A-SMLC with cell information and radio measurements, another response from D-SMLC may include the positioning result. However there are four messages in above flow.
2) If D-SMLC is using AECID as the only positioning method, the on-line measurement data collection will have to be done by adding at least another round of message delivery, such signaling is not defined in standard yet which could be a big change for all vendors.
3) The flow is connection-oriented which require more processing and network resource at lower layer.

Figure 4:
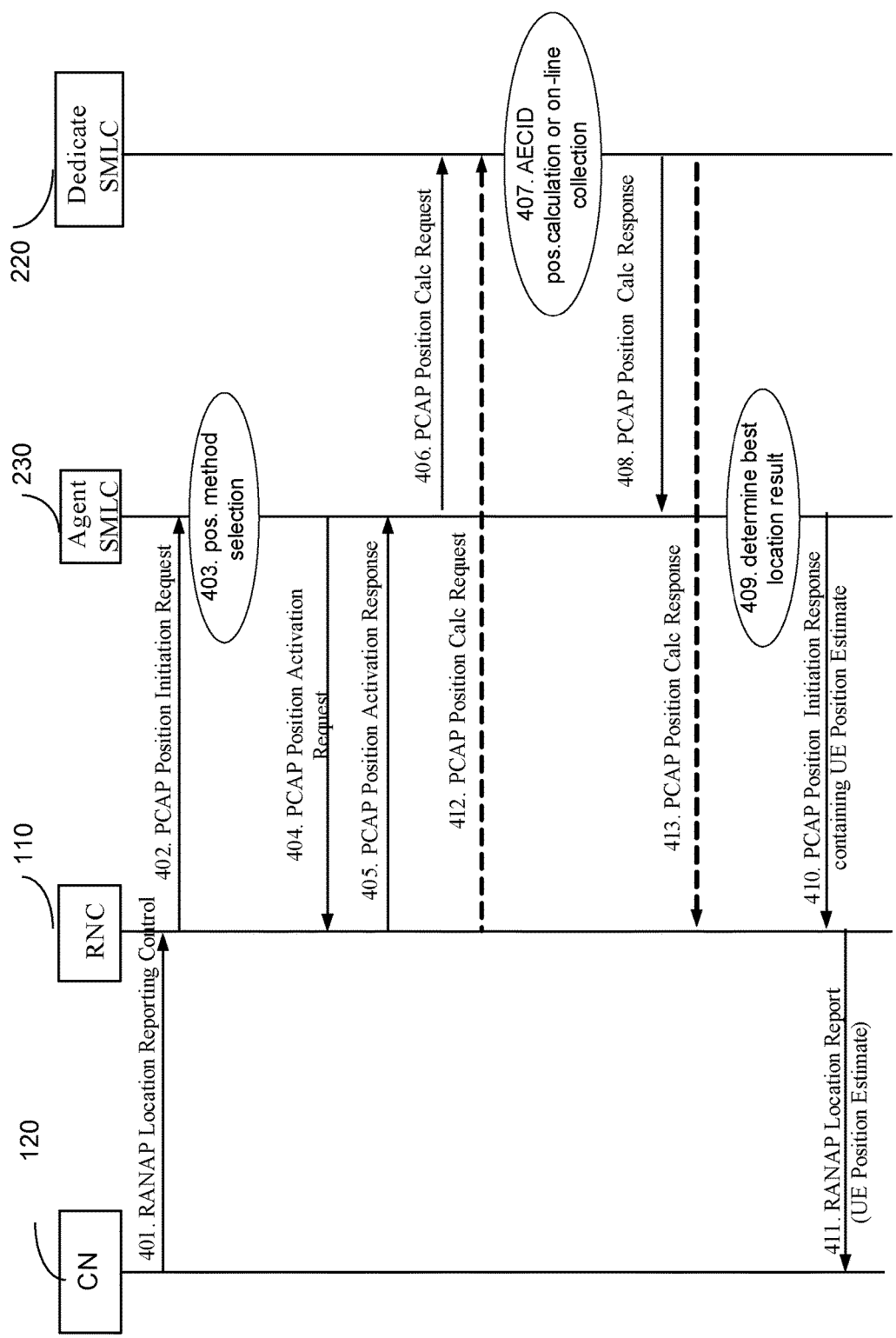
FIG. 4 is a message sequence chart showing mobile positioning according to a second exemplary embodiment.

FIG. 4 is a message sequence chart showing mobile positioning according to a second exemplary embodiment.

At least some drawbacks listed above for the first embodiment are mitigated by the second embodiment as described below. According to 3GPP 25.453 V 10.3.0 (2011 June), the purpose of the Position Calculation procedure is to enable an RNC to query an SAS for a position estimate of a UE. The procedure uses connectionless signaling.

Below steps is a typical signaling sequence. Core Network (CN) may be for example an MSC:

In a first case there is A-SMLC between RNC and D-SMLC, see FIG. 2.

Steps 401 to step 403 are identical with step 301 to step 303 in FIG. 3.

If a positioning method not supported by the A-SMLC such as a fingerprinting method, e.g. AECID, is selected, the A-SMLC determines that involvement by a second location node, D-SMLC, is needed and initiates an AECID positioning procedure in step 404 by sending a PCAP: Position Activation Request message to RNC which contains requested cell measurement types via the Iupc interface. The PCAP Position Activation Request message may include periodic reporting information (number of reports and reporting interval). Also other positioning methods can be selected and used e.g. A-GPS/OTDOA/UTDOA. This signal triggers signals 405 below such that in signal 406 a trigger for positioning information about the UE is sent to the D-SMLC.

In step 405 the RNC gets the requested measurements from UE via RRC signalling and send the A-SMLC in a PCAP: Position Activation Response message.

The A-SMLC assembles a trigger for positioning information about the UE such as PCAP: Position Calculation Request message and forwards to the D-SMLC in step 406. For example the "Initial UE position estimate" which was intended to be used (per 3GPP spec) for rough location reporting may also be used for AECID on-line data collection. That is, if A-SMLC can have high accuracy positioning result (e.g A-GPS/UTDOA) at hand, it may add "UE position estimate info" element in Position Calculation Request and forward it to D-SMLC together with "Cell-ID Measured Results Sets".

In step 407 the D-SMLC calculates the UE position and optional velocity using a second positioning procedure such as fingerprinting, e.g. the AECID method. If both "Initial UE position estimate" and "Cell-ID Measured Results Sets" are available, D-SMLC has the option to do either on-line data collection and populate a database with these parameters or AECID positioning based on logic in FIG. 5 or FIG. 6. Thus, the D-SMLC, upon receiving the trigger for positioning information and determining the presence of an environment measurement parameter, determining the position information of the UE by performing a second positioning procedure based on the environment measurement parameter. Such as environment measurement parameter can comprise RF measurement data such as cell Ids, Quantized path loss, signal strength measurements, Quantized Round Trip Time (RTT, in WCDMA) or Timing Advance (TA, in GSM and LTE), or UE Rx-Tx time difference (in LTE), Quantized noise rise, Quantized signal quality e.g. RxQual in GSM, Ec/N0 in WCDMA and RSRQ in LTE, Radio connection information like the radio access bearer (RAB), Quantized time. Preferably, the database is only populated if the geographical area information parameter meets an accuracy criterion as for example a certain shape or precision metric. Sufficiently accurate position measurements can be obtained using high precision reference method such as A-GPS, OTDOA, U-TDOA. Thereby based on "initial UE position estimate", D-SMLC may apply different logic (FIG. 5/FIG. 6) to do either positioning or data collection (record down both accurate location of terminal and its measurement report).

The position calculation response with the positioning information is sent in step 408 where the D-SMLC returns the UE position and optional velocity to the RNC in a PCAP: Position Calculation Response message.

Steps 409 to step 411 are identical with steps 311 to step 313 in FIG. 3.

In a second case there is direct signaling between RNC and D-SMLC

Step 401 is identical with step 301 in FIG. 3. The signaling then continues with step 412 where, if RNC determines by using a first positioning procedure that involvement by a second node such as a D-SMLC is needed, decides to do AECID positioning or deliver on-line collected data to D-SMLC, it initiates triggering the D-SMLC by assembling PCAP: Position Calculation Request message and forwards to the D-SMLC. For example the "Initial UE position estimate" which was intended to be used (per 3GPP spec) for rough location reporting may also be used for AECID on-line data collection. That is, if RNC can have high accuracy positioning result (e.g AGPS/UTDOA) at hand, it may add "UE position estimate info" element in Position Calculation Request and forward it to D-SMLC together with "Cell-ID Measured Results Sets". Step 407, as previously described, is then performed.

D-SMLC returns a position calculation response with the UE position and optional velocity to the A-SMLC in a PCAP: Position Calculation Response message in step 413.

Steps 409 to step 411 are identical with steps 311 to step 313 in FIG. 3.

TS25.453 V10.3.0 (2011 June) defines the three messages related to Position Calculation procedure.
(I) A Position Calculation Response message includes, according to paragraph 9.1.3, the following parameters:
  optional Initial UE Position Estimate parameter of type Geographical Area
  Cell-ID Measured Results Sets including a Cell-ID Measured Results Sets having a Cell-ID Measured Results Info List.
(II) A Position Calculation Response message includes, according to paragraph 9.1.4, a UE Position Estimate of type Geographical Area.
(III) A POSITION CALCULATION FAILURE message, according to paragraph 9.1.5

The Geographical Area is coded according to paragraph 9.2.2.6 and may be coded in different ways. For example, a point with uncertainty, a polygon, an ellipsoid point with uncertainty ellipse or an ellipsoid arc.

Thus, according to TS 25.453 V10.3.0 (2011 June), if the Initial UE Position Estimate IE is included in the POSITION CALCULATION REQUEST message the SAS shall use this value for the calculation of the UE Position Estimate in case of A-GPS or A-GANSS positioning methods are used. The SAS may use this value for the calculation of the UE Position when any other methods are used. This procedure is herein extended to be used between SMLCs and also RNC-SMLC interface, see FIG. 2. The IE Initial UE Position Estimation is used to carry ground truth, meaning to be accurate location estimate or true location of a terminal for example based on other high accuracy positioning method including conventional GPS, A-GPS, UTDOA, OTDOA etc., of AECID or other fingerprinting on-line data collection. That means, the UE position estimation parameter may carry data about the true position of the UE as obtained via a high accuracy positioning method as for example A-GPS, UTDOA.

The original procedure inside SMLC is thereby changed to cover two cases A and B described below with reference to FIG. 5 and FIG. 6.

Figure 5:
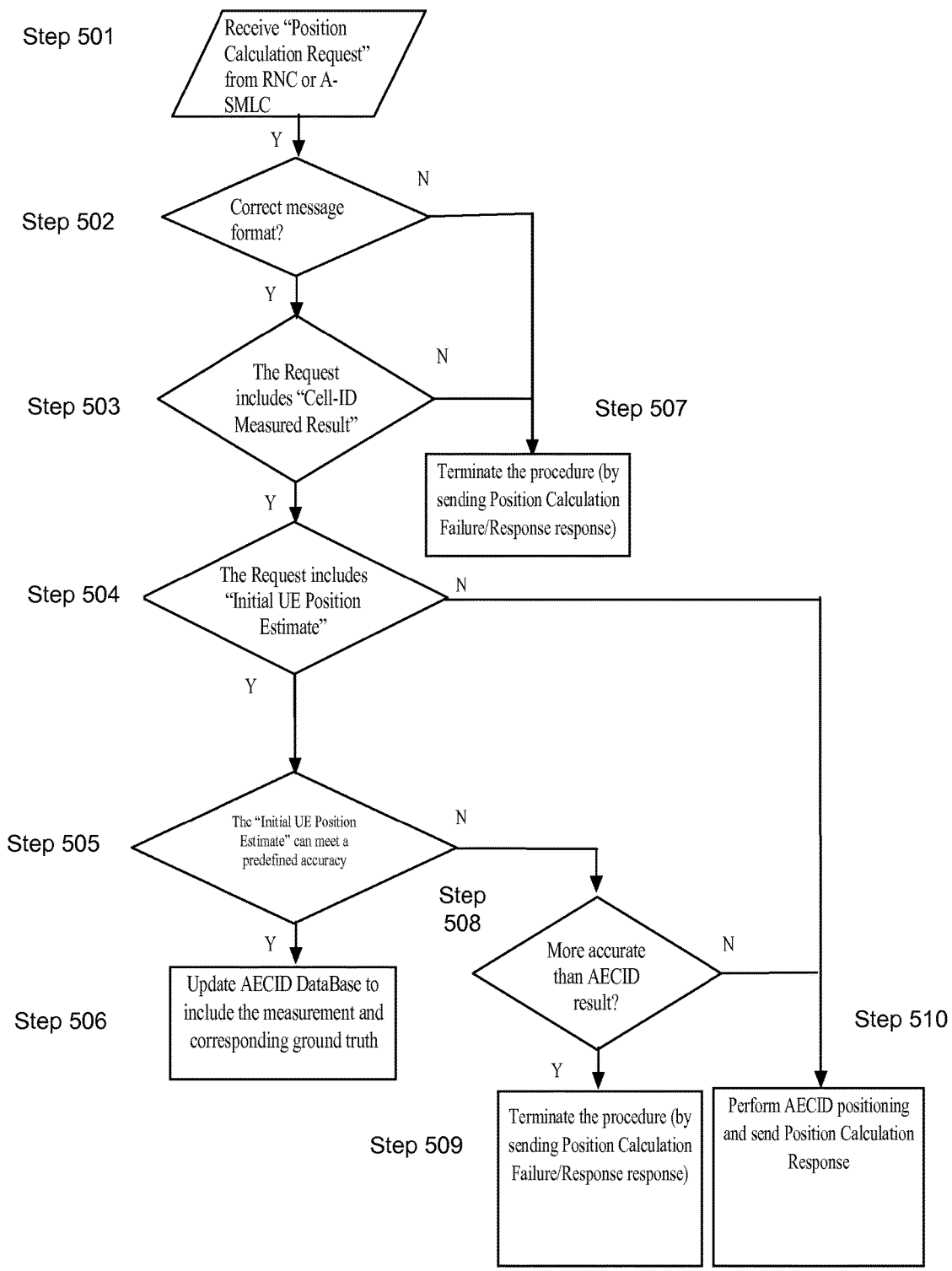
FIG. 5 shows an example flow chart for a D-SMLC according to a first exemplary embodiment.

FIG. 5 shows an example flow chart for a D-SMLC according to a first exemplary embodiment.

Case A: RNC/A-SMLC initiated with a POSITION CALCULATION REQUEST. When the D-SMLC receives the POSITION CALCULATION REQUEST message, if below conditions are met:
  The Position Calculation Request is in good format
  The Position Calculation Request does NOT include IE Initial UE Position Estimate, or, the Position Calculation Request includes IE Initial UE Position Estimate but this estimate is less accurate than AECID positioning result. Such accuracy evaluation can be performed by D-SMLC based on both confidence and uncertainty information (highlighted) in IE Initial UE Position Estimate.

The Position Calculation Request includes IE Cell-ID Measured Results Sets

D-SMLC may then assume RNC/A-SMLC is expecting AECID position estimate thus send Position Calculation Respond after AECID positioning is done.

Otherwise:

D-SMLC may either:

(1) send Position Calculation Failure to indicate a failure or, (2) send Position Calculation Response which includes IE UE Position Estimate which is a copy of Initial UE Position Estimate from Position Calculation Request, in order to indicate it is unnecessary to do AECID positioning(the initial UE positioning estimate is good enough).

With reference to FIG. 5, in step 501 the D-MLC is triggered by receiving a Position Calculation Request from an RNC or an A-SMLC. In step 502 it is checked whether the Position Calculation Request was received in a correct message format and if not, the procedure is terminated by the D-SMLC by sending a Position Calculation Failure or Position Calculation Response response message in step 507. If the correct message format was received in step 502, the D-SMLC checks in step 503 whether the Position Calculation Request includes the presence of any environment measurement parameter e.g. Cell-ID Measured Result. If not, the procedure is terminated by the D-SMLC by sending a Position Calculation Failure or Position Calculation Response response message in step 507. If a Cell-ID Measured Result was received in step 503 it is checked in step 504 whether the Position Calculation Request includes an Initial UE Position Estimate. If not, AECID positioning is performed in step 510 and a Positioning Calculation Response is sent. If the Position Calculation Request includes a geographical area information parameter e.g. an Initial UE Position Estimate it is checked in step 505 whether the Initial UE Position Estimate can meet a predefined accuracy. If not, it is checked in step 508 whether the Initial UE Position Estimate is more accurate than the AECID result and if that is not the case then AECID positioning is performed in step 510 and a positioning calculation response is sent. If, however, the Initial UE Position Estimate is more accurate than the AECID result the procedure is terminated in step 509 by sending a Position Calculation Failure or Position Calculation Response response. If the check in step 505 results in that the Initial UE Position Estimate can meet a predefined accuracy the AECID Database is updated in step 506 to include the measurement and corresponding ground truth.

Figure 6:
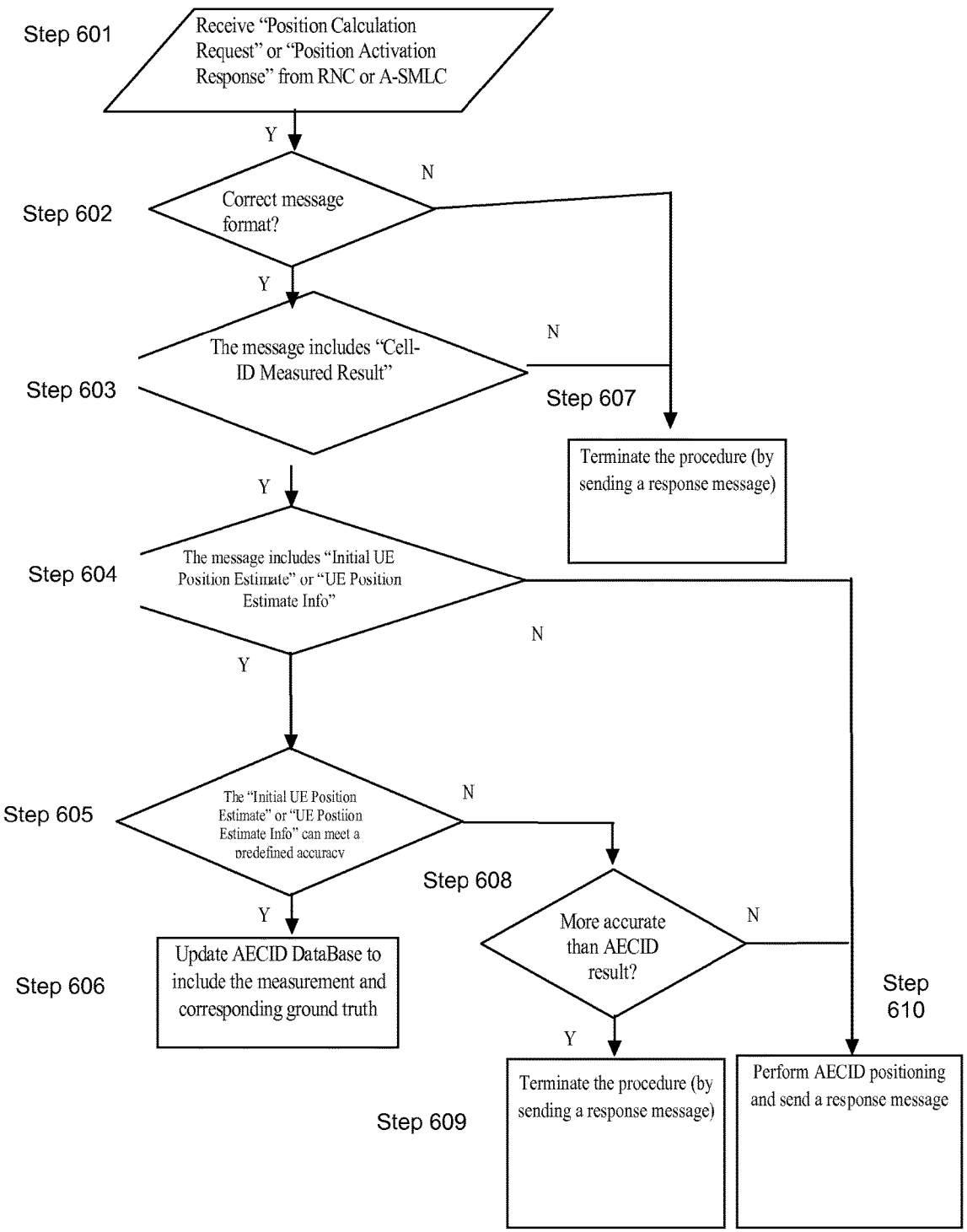
FIG. 6 shows an example flow chart for a D-SMLC according to a second exemplary embodiment.

FIG. 6 shows an example flow chart for a D-SMLC according to a second exemplary embodiment.

Case B: RNC/A-SMLC initiated with a POSITION CALCULATION REQUEST. When the D-SMLC receives the POSITION CALCULATION REQUEST message, if below conditions are met:

The Position Calculation Request is in good format

The Position Calculation Request includes IE Initial UE Position Estimate, and, the IE Initial UE Position Estimate is more accurate than a predefined threshold. Such accuracy evaluation can be performed by D-SMLC based on both confidence and uncertainty information (highlighted) in IE Initial UE Position Estimate.

The Position Calculation Request includes IE Cell-ID Measured Results Sets

Accuracy evaluation may also be based on shape i.e. to populate only when the location shape is e.g. ellipse, and ignore if it is an Arc. So the criterion can be accuracy, or shape type etc. D-SMLC may then assume RNC/A-SMLC is delivering a qualified on-line collected measurement. D-SMLC then use the measurement to populate the AECID data base, and set ground truth of this measurement based on information in Initial UE Position Estimate. A Position Calculation Response is also sent which include a copy of the IE Cell-ID Measured Results Sets in Position Calculation Request as a confirmation of DB operation.

Otherwise:

D-SMLC may either:

(1) send Position Calculation Failure to indicate a failure or, (2) send Position Calculation Response which includes IE UE Position Estimate which is a copy of Initial UE Position Estimate from Position Calculation Request, in order to indicate it is unnecessary to do AECID positioning(the initial UE positioning estimate is good enough).

With reference to FIG. 6, in step 601 the D-MLC is triggered by a Position Calculation Request or Position Activation Response message from an RNC or an A-SMLC. In step 602 it is checked whether the message was received in a correct message format and if not, the procedure is terminated by the D-SMLC by sending a response message in step 607. If the correct message format was received in step 602, the D-SMLC checks in step 603 whether the message includes any environment measurement parameter e.g. Cell-ID Measured Result. If not, the procedure is terminated by the D-SMLC by sending a response message in step 607. If a Cell-ID Measured Result was received in step 603 it is checked in step 604 whether the message includes an a geographical area information parameter e.g. Initial UE Position Estimate or UE Position Estimate Info. If not, AECID positioning is performed in step 610 and a response message is sent. If the message includes an Initial UE Position Estimate or UE Position Estimate Info it is checked in step 605 whether the Initial UE Position Estimate or UE Position Estimate Info can meet a predefined accuracy. If not, it is checked in step 608 whether the Initial UE Position Estimate or UE Position Estimate Info is more accurate than the AECID result and if that is not the case then AECID positioning is performed in step 610 and a response is sent. If, however, the Initial UE Position Estimate or UE Position Estimate Info is more accurate than the AECID result the procedure is terminated in step 609 by sending a response message. If the check in step 605 results in that the Initial UE Position Estimate or UE Position Estimate Info can meet a predefined accuracy the AECID Database is updated in step 606 to include the measurement and corresponding ground truth.

Figure 7:
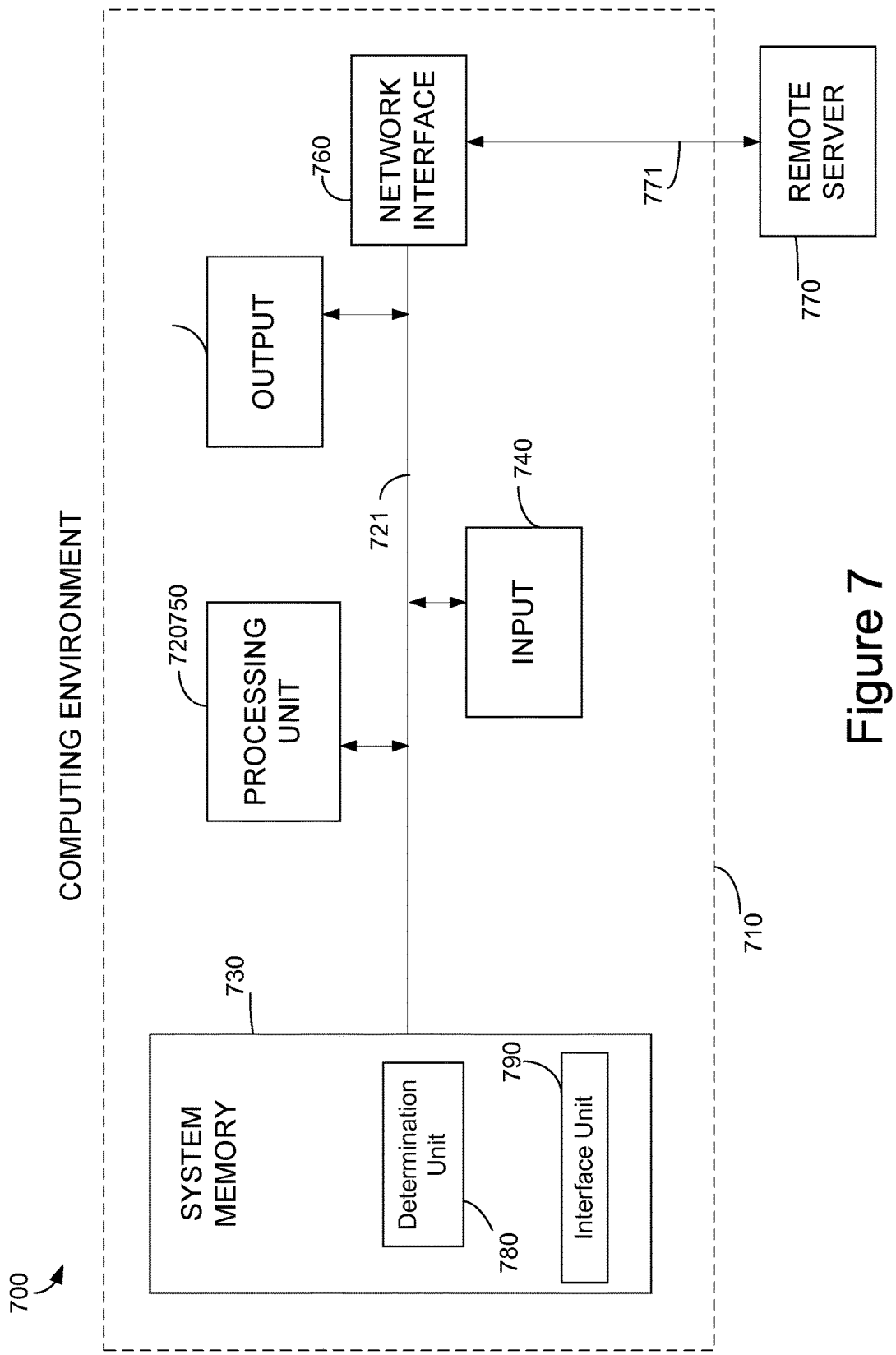
FIG. 7 is a block diagram showing an exemplary embodiment of an SMLC (A-SMLC or D-SMLC).

FIG. 7 is a block diagram showing an exemplary embodiment of an SMLC (A-SMLC or D-SMLC) for determining a location of a mobile terminal in the form of computing system environment 700.

Although as made clear above, the computing system environment 700 is only one example of a suitable computing environment for an A-SMLC or a D-SMLC and is not intended to suggest any limitation as to the scope of use or functionality of the claimed subject matter. Further, the computing environment 700 is not intended to suggest any dependency or requirement relating to the claimed subject matter and any one or combination of components illustrated in the example operating environment 700.

An example of a device for implementing the previously described innovation includes a general purpose computing device in the form of a computer 710. Components of computer 710 can include, but are not limited to, a processing unit 720, a system memory 730, and a system bus 721 that couples various system components including the system memory to the processing unit 720. The system bus 721 can be any of several types of bus structures including a memory bus or memory controller, a peripheral bus, and a local bus using any of a variety of bus architectures.

Computer 710 can include a variety of computer readable media. Computer readable media can be any available media that can be accessed by computer 710. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media can embody computer readable instructions, data structures, program modules or other data in a modulated data signal such as a carrier wave or other transport mechanism and can include any suitable information delivery media.

The system memory 730 can include computer storage media in the form of volatile and/or nonvolatile memory such as read only memory (ROM) and/or random access memory (RAM). A basic input/output system (BIOS), containing the basic routines that help to transfer information between elements within computer 710, such as during start-up, can be stored in memory 730. Memory 730 can also contain data and/or program modules that are immediately accessible to and/or presently being operated on by processing unit 720. By way of non-limiting example, memory 730 can also include an operating system, application programs, other program modules, and program data.

In one embodiment the Interface Unit 790 is a software module loaded in the memory and processable by the processing unit, adapting the location node for receiving a request message for a first positioning procedure, and the Determination Unit 780 is a software module loaded in the memory and processable by the processing unit adapting the location node for determining using the first positioning procedure that involvement by a second location node is needed. The interface unit software module further adapting the location node for initiating a trigger for positioning information about the UE to be sent to the second location node.

In another embodiment the Interface Unit 790 is a software module loaded in the memory and processable by the processing unit, adapting the location node for receiving a trigger for positioning information, and the Determination Unit 780 is a software module loaded in the memory and processable by the processing unit adapting the location node for determining the presence of an environment measurement parameter in said trigger; determining the position information of the UE by performing a positioning procedure based on the environment measurement parameter. The interface unit software module further adapting the location node sending a position calculation response with the positioning information.

The computer 710 can also include other removable/non-removable and volatile/nonvolatile computer storage media. For example, computer 710 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 721 through a non-removable memory interface such as an interface, and a magnetic disk drive or optical disk drive can be connected to the system bus 721 by a removable memory interface, such as an interface.

A user can enter commands and information into the computer 710 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 720 through user input 740 and associated interface(s) that are coupled to the system bus 721, but can be connected by other interface and bus structures, such as a parallel port, game port or a universal serial bus (USB).

A graphics subsystem can also be connected to the system bus 721. In addition, a monitor or other type of display device can be connected to the system bus 721 through an interface, such as output interface 750, which can in turn communicate with video memory. In addition to a monitor, computers can also include other peripheral output devices, such as speakers and/or printing devices, which can also be connected through output interface 750.

The computer 710 can operate in a networked or distributed environment using logical connections to one or more other remote computers, such as remote server 770, which can in turn have media capabilities different from device 710. The remote server 770 can be a personal computer, a server, a router, a network PC, a peer device or other common network node, and/or any other remote media consumption or transmission device, and can include any or all of the elements described above relative to the computer 710. The logical connections depicted in FIG. 7 include a network 771, such as a local area network (LAN) or a wide area network (WAN), but can also include other networks/buses.

When used in a LAN networking environment, the computer 710 is connected to the LAN771 through a network interface or adapter. When used in a WAN networking environment, the computer 710 can include a communications component, such as a modem, or other means for establishing communications over a WAN, such as the Internet. A communications component, such as a modem, which can be internal or external, can be connected to the system bus 721 through the user input interface at input 740 and/or other appropriate mechanism.

In a networked environment, program modules depicted relative to the computer 710, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Some advantages of examples of various embodiments disclosed herein are:
Use one procedure to support both AECID positioning and on-line data collection which is more efficient in terms of SCCP signaling and message handling.
The proposed logic at D-SMLC side is compatible with legacy RNC.
Can solve multi-vendor AECID issue in an elegant way.
Standardization work is not necessary.
The solution is compatible with existed standard and product because:
In 3GPP TS25.453 context, the IE Initial UE position Estimate is intended to be reference location for AGPS/AGNSS or an initial guess of UE rough location.
Normally this estimate is with low accuracy (e.g. cell level accuracy) so will not be mistakenly used as ground truth of AECID on-line measurement (require a GPS level accuracy). Therefore the new D-SMLC can interwork with legacy RNC properly.
From RNC viewpoint, some vendors only support RNC centric mode for positioning. The proposed solution fits this well since Position Calculation procedure belongs to RNC centric mode.
Further, there is no need to have additional signaling elements into standard.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. In particular, although exemplified by WCDMA, the invention is not limited to WCDMA.

The invention claimed is:

1. A method for determining a position of a UE, the method comprising:
a first network node receiving a request for positioning information about the UE;
the first network node requesting a first positioning procedure at a first location node;
the first location node determining using the first positioning procedure that involvement by a second location node is needed;
the first location node initiating a trigger for positioning information about the UE to be sent to the second location node, wherein the first and second location nodes comprise first and second serving mobile location centers (SMLCs), respectively;
the second location node, upon receiving the trigger for positioning information and determining the presence of an environment measurement parameter in said request, determining the position information of the UE by performing a second positioning procedure that the first SMLC does not support, based on the environment measurement parameter, and
sending a position calculation response with the positioning information,
wherein the second location node performing the second positioning procedure based on the environment measurement parameter comprises performing a finger printing positioning method that the second SMLC supports and the first SMLC does not support, using measurement data of path loss or signal strength.

2. A method according to claim 1,
wherein the second SMLC comprises a dedicated SMLC that is configured to support only a single positioning method,
wherein the first network node comprises a Radio Network Controller (RNC),
wherein the dedicated SMLC comprises a first communications interface with the RNC and a second communications interface with the first SMLC,
wherein the first SMLC comprises a third communications interface with the RNC, and
wherein the method further comprises:
sending the trigger for positioning information about the UE to the second location node from the RNC, via the first communications interface, or from the first location node, via the second communications interface; and
sending the position calculation response with the positioning information to the RNC, via the first communications interface, or to the first location node, via the second communications interface.

3. A method according to claim 2 wherein the trigger for positioning information about the UE to be sent to the second location node is a PCAP Position Calculation Request message or a PCAP Activation Response message and the position calculation response is a PCAP Position Calculation Response message or a PCAP Position Initiation Response message, respectively.

4. A method according to claim 1, further comprising:
the second location node, upon receiving the trigger for positioning information and determining the presence of a geographical area information parameter and a environment measurement parameter, populating a database with said parameters.

5. A method according to claim 4 further comprising executing the populating following affirmatively checking that the geographical area information parameter meets a first accuracy criterion.

6. A method according to claim 4 wherein determining the position information of the UE by performing a second positioning procedure is performed based on the condition that the geographical area information parameter meets a second accuracy criterion.

7. A method according to claim 4, wherein the geographical area information parameter is a high precision reference position such as A-GPS, OTDOA, U-TDOA.

8. A method according to claim 1 wherein the finger printing method that the second SMLC supports and the first SMLC does not support comprises Adaptive Enhanced Cell ID (AECID).

9. A method for determining a position of a UE, performed by a first location node, comprising:
receiving a request for a first positioning procedure;
determining using the first positioning procedure that involvement by a second location node is needed; and
initiating a trigger for positioning information about the UE to be sent to the second location node,
wherein the first and second location nodes comprise first and second serving mobile location centers (SMLCs), respectively, and
wherein the first and second SMLCs comprise first and second communications interfaces, respectively, configured to provide direct signaling with a same Radio Network Controller (RNC).

10. A method according to claim 9 wherein the trigger for positioning information about the UE to be sent to the second location node being a PCAP Position Calculation Request message or a PCAP Position Activation Response message.

11. A first location node for determining a position of a UE comprising:
an interface unit adapting the first location node for receiving a request for a first positioning procedure;
a determination unit adapting the first location node for:
determining using the first positioning procedure that involvement by a second location node is needed, and
the interface unit further adapting the first location node for:
initiating a trigger for positioning information about the UE to be sent to the second location node,
wherein the first and second location nodes comprise first and second serving mobile location centers (SMLCs), respectively,
wherein the interface unit comprises a first communications interface that is configured to provide direct signaling with a Radio Network Controller (RNC),
wherein the second SMLC comprises a second communications interface that is configured to provide direct signaling with the RNC, and
wherein the second SMLC is configured to support a second positioning procedure that the first SMLC is not configured to support.

12. The first location node according to claim 11 wherein the trigger for positioning information about the UE to be sent to the second location node comprises a PCAP Position Calculation Request message or a PCAP Position Activation Response message.

13. A method for determining a position of a UE, performed by a location node comprising a first serving mobile location center (SMLC), the method comprising:
receiving, via an SMLC-to-SMLC interface with a second SMLC, a trigger for positioning information;
determining the presence of an environment measurement parameter in said trigger;
determining the position information of the UE by performing a positioning procedure that is not supported by the second SMLC, based on the environment measurement parameter,
wherein performing the positioning procedure based on the environment measurement parameter comprises performing a finger printing positioning method that the first SMLC supports and the second SMLC does not support, using measurement data of path loss or signal strength; and
sending, via the SMLC-to-SMLC interface, a position calculation response with the positioning information.

14. A method according to claim 13 further comprising:
the first SMLC, upon receiving the trigger for positioning information and determining the presence of a geographical area information parameter and an environment measurement parameter, populating a database with said parameters, wherein the first SMLC comprises a dedicated SMLC that is configured to support only a single positioning method, wherein the single positioning method comprises the positioning procedure that is not supported by the second SMLC.

15. A method according to claim 14 further comprising executing the populating following affirmatively checking that the geographical area information parameter meets a first accuracy criterion.

16. A method according to claim 14 wherein determining the position information of the UE by performing a positioning procedure is performed based on the condition that the geographical area information parameter meets a second accuracy criterion.

17. A method according to claim 14, wherein the geographical area information parameter is a high precision reference position such as A-GPS, OTDOA, U-TDOA.

18. A method according to claim 13 wherein the finger printing method that is not supported by the second SMLC comprises Adaptive Enhanced Cell ID (AECID).

19. A first location node for determining a position of a UE comprising:
an interface unit adapting the first location node for receiving, from a second location node, a trigger for positioning information, wherein the first and second location nodes comprise first and second serving mobile location centers (SMLCs), respectively;
a determination unit adapting the first location node for:
determining the presence of an environment measurement parameter in said trigger; and
determining the position information of the UE by performing a positioning procedure that the second SMLC is not configured to support, based on the environment measurement parameter, and
the interface unit further adapting the first location node for sending a position calculation response with the positioning information,
wherein performing the positioning procedure based on the environment measurement parameter comprises performing a finger printing positioning method that the first SMLC is configured to support and the second SMLC is not configured to support, using measurement data of path loss or signal strength.

20. The first location node according to claim 19, wherein the determination unit further adapts the first location node for, upon receiving the trigger for positioning information and determining the presence of a geographical area information parameter and an environment measurement parameter, populating a database with said parameters.

21. The first location node according to claim 20 wherein the determination unit further adapts the first location node for executing the populating following affirmatively checking that the geographical area information parameter meets a first accuracy criterion.

22. The first location node according to claim 20 wherein the determination unit further adapts the first location node for determining the position information of the UE by performing the positioning procedure on the condition that the geographical area information parameter meets a second accuracy criterion.

23. The first location node according to claim 20, wherein the geographical area information parameter is a high precision reference position such as A-GPS, OTDOA, U-TDOA.

24. The first location node according to claim 19 wherein:
the first SMLC comprises a dedicated SMLC that is configured to support only a single positioning method;
the single positioning method comprises the finger printing positioning procedure that the second SMLC is not configured to support; and
the finger printing procedure that the second SMLC is not configured to support comprises Adaptive Enhanced Cell ID (AECID).

* * * * *